United States Patent [19]

Blom

[11] 4,169,684
[45] Oct. 2, 1979

[54] CONTROL DEVICE FOR A MATRIX PRINTER

[75] Inventor: Nico Blom, Rijswijk, Netherlands

[73] Assignee: U.S. Philips Corporation, New York, N.Y.

[21] Appl. No.: 854,789

[22] Filed: Nov. 25, 1977

[30] Foreign Application Priority Data

Jan. 12, 1976 [NL] Netherlands ............... 7613358

[51] Int. Cl.² .................................... B41J 3/12
[52] U.S. Cl. ............................ 400/124; 101/93.05; 364/900
[58] Field of Search ............ 400/124, 119, 303, 120, 400/125; 101/93.05; 364/900 MS File

[56] References Cited

U.S. PATENT DOCUMENTS

| | | | |
|---|---|---|---|
| 3,789,969 | 2/1974 | Howard et al. | 400/124 |
| 3,802,544 | 4/1974 | Howard et al. | 400/124 |
| 3,833,891 | 9/1974 | Howard et al. | 364/900 |
| 4,024,506 | 5/1977 | Spaargaren | 101/93.04 X |

Primary Examiner—Paul T. Sewell
Attorney, Agent, or Firm—Thomas A. Briody; Edward J. Connors, Jr.; James J. Cannon, Jr.

[57] ABSTRACT

A control device for a matrix printer. At the beginning of a line, a chaining unit is filled with a starting column address, a starting row address and a starting character address, the latter being to address a line buffer containing data of a line of characters. The line buffer supplies a character signal which addresses a character generator having column addresses and row addresses as further sub-addresses. The chaining unit contains data about the relevant row advances and column advances. Between the displacement of the movable member over one column distance, the chaining circuit successively calculates dot data for all recording elements, said data being serially loaded into a dot register. When the next column position is reached, the dot data are used to activate the recording elements. The character generator has at least two sets of characters of different dimensions, and the chaining unit has for each character set at least one mode position for translating the column advances and row advances into addresses for the character generator. The advances may be embodied in a counter or a read-only memory.

4 Claims, 11 Drawing Figures

| | | | | | | | | | | | |
|---|---|---|---|---|---|---|---|---|---|---|---|
| 1 | 1 | 232 | 232 | 1 | 222 | 222 | 5 | 218 | 218 | 7 |
| 2 | 2 | 232 | 235 | 1 | 222 | 226 | 7 | 218 | 223 | 4 |
| 3 | 3 | 232 | 238 | 1 | 222 | 230 | 9 | 218 | 228 | 1 |
| 4 | 4 | | 241 | 1 | | 235 | 1 | | 232 | 7 |
| 5 | 5 | | 244 | 1 | | 239 | 3 | | 237 | 4 |
| 6 | 6 | | 247 | 1 | | 243 | 5 | | 242 | 1 |
| 7 | 7 | | 250 | 1 | | 247 | 7 | | 246 | 7 |
| 8 | 8 | | 253 | 1 | | 251 | 9 | | 251 | 4 |
| 9 | 9 | | 0 | 1 | | 0 | 1 | | 0 | 1 |
| 10 | 1 | | 3 | 1 | | 4 | 3 | | 4 | 7 |
| 11 | 2 | | 6 | 1 | | 8 | 5 | | 9 | 4 |
| 12 | 3 | | 9 | 1 | | 12 | 7 | | 14 | 1 |
| 13 | 4 | | 12 | 1 | | 16 | 9 | | 18 | 7 |
| 14 | 5 | | 15 | 1 | | 21 | 1 | | 23 | 4 |
| 15 | 6 | | 18 | 1 | | 25 | 3 | | 28 | 1 |
| 16 | 7 | | 21 | 1 | | 29 | 5 | | 32 | 7 |
| 17 | 8 | | 24 | 1 | | 33 | 7 | | 37 | 4 |
| 18 | 9 | | 27 | 1 | | 37 | 9 | | 42 | 1 |
| 19 | 1 | | 30 | 1 | | 42 | 1 | | 46 | 7 |
| 20 | 2 | | 33 | 1 | | 46 | 3 | | 51 | 4 |
| | | | | | | | | | | |
| 54 | 9 | 232 | 135 | 1 | 222 | 189 | 1 | 218 | 210 | 1 |
| 1 | 1 | 232 | 232 | 2 | 222 | 222 | 6 | 218 | 218 | 8 |
| 2 | 2 | | 235 | 2 | | 226 | 8 | | 223 | 5 |
| 3 | 3 | | 238 | 2 | | 230 | 10 | | 228 | 2 |
| | | | | | | 235 | 2 | | 232 | 8 |
| | | | | | | 239 | 4 | | 237 | 5 |
| | | | | | | 243 | 6 | | 242 | 2 |
| | | | | | | 247 | 8 | | 246 | 8 |
| | | | | | | 251 | 10 | | 251 | 5 |
| | | | | | | 0 | 2 | | 0 | 2 |
| | | | | | | 4 | 4 | | 4 | 8 |
| | | | | | | | | | | |
| 54 | 9 | 232 | 135 | 2 | 222 | 189 | 2 | 218 | 210 | 2 |

Fig.9a

| 1 | 1 | 232 | 232 | 3 | 222 | 222 | 7 | 218 | 218 | 9 |
|---|---|---|---|---|---|---|---|---|---|---|
|   |   |   |   |   |   | 226 | 9 |   | 223 | 6 |
|   |   |   |   |   |   | 231 | 1 |   | 228 | 3 |
|   |   |   |   |   |   | 235 | 3 |   | 232 | 9 |
|   |   |   |   |   |   | 239 | 5 |   |   |   |
|   |   |   |   |   |   | 243 | 7 |   |   |   |
|   |   |   |   |   |   | 247 | 9 |   |   |   |
|   |   |   |   |   |   | 252 | 1 |   |   |   |
|   |   |   |   |   |   | 0 | 3 |   |   |   |
|   |   |   |   |   |   | 4 | 5 |   |   |   |
| 54 | 9 | 232 | 135 | 3 | 222 | 189 | 3 | 218 | 210 | 3 |
| 1 | 1 | 232 | 232 | 4 | 222 | 222 | 8 | 219 | 219 | 1 |
| ⋮ | ⋮ | ⋮ | ⋮ |   | ⋮ |   |   | ⋮ |   |   |
| 54 | 9 | 232 | 135 | 4 | 222 | 189 | 4 | 219 | 210 | 4 |
| 1 | 1 | 232 | 232 | 5 | 222 | 222 | 9 | 219 | 219 | 2 |
|   |   |   |   | 6 |   |   | 10 |   |   | 3 |
|   |   |   |   | 7 |   | 223 | 1 |   |   | 4 |
|   |   |   |   | 8 |   |   | 2 |   |   | 5 |
|   |   |   |   | 9 |   |   | 3 |   |   | 6 |
|   |   |   |   | 10 |   |   | 4 |   |   | 7 |
|   |   |   |   | 11 |   |   | 5 |   |   | 8 |
|   |   |   |   | 12 |   |   | 6 |   |   | 9 |
|   |   |   |   | 13 |   |   | 7 |   | 220 | 1 |
|   |   |   |   | 14 |   |   | 8 |   |   | 2 |
| 1 | 1 | 233 | 233 | 1 |   |   | 9 |   |   | 3 |
| ⋮ | ⋮ | ⋮ | ⋮ |   | ⋮ |   |   | ⋮ |   |   |
| 1 | 1 | 3 | 3 | 14 | 5 | 2 |   | 5 | 6 |   |
| ⋮ | ⋮ | ⋮ | ⋮ |   | ⋮ | ⋮ |   | ⋮ | ⋮ |   |
| 54 | 9 | 3 | 161 | 14 |   | 225 | 8 |   | 251 | 9 |

CONTROL DEVICE FOR A MATRIX PRINTER

BACKGROUND OF THE INVENTION

1. Field of the Invention

The invention relates to a control device for activating recording elements in a recording device for the recording of characters which are composed of dot-shaped or line-shaped elements which are arranged in rows and columns on a record carrier, said recording device comprising a member which can be driven in front of the record carrier in a row direction, said member comprising at least one group of recording elements which are adapted to record a character element, each group comprising a number of recording elements which at least equals the maximum number of rows of character elements in a character, at least one recording element being associated with each row within a group such that each time a predetermined row jump or advance is present between successive recording elements of a group, and between successive recording elements, at a transition between successive groups, the recording elements being staggered in the row direction in that between successive recording elements of a group and between successive recording elements, at a transition between successive groups, each time a predetermined column advance or jump is present whereby, in the case of the presence of a plurality of groups of said groups succeed each other in the line direction, said control device furthermore comprising a buffer memory for receiving the characters to be recorded together on a row, a character generator having a first sub-address input which is connected to an output of the buffer memory for the general addressing of a character, a dot memory having an input which is connected to an output of the character generator for storing character element data and having outputs which are suitable to supply control signals for the relevant recording elements, so that per displacement of said movable member over one column distance, and each time per recording element, a character element is supplied, measuring means being provided for supplying movement signals and position signals concerning said member in order to activate, per column displacement thereof, said dot memory through a connection between an output of said measuring means and an input of said dot memory, a further output of said measuring means being connected to an input of said buffer memory in order to form, at the start of a line to be recorded by way of a movement of said member in a first direction, a starting address for the buffer memory and a starting condition signal for said character generator by means of a chaining unit, an input of which is connected to an output of said measuring means, outputs thereof being connected to an address input of said buffer memory, and a second sub-address input of said character generator for supplying a row or column address for a character generally addressed by said first sub-address, said chaining unit containing the data of said row advances and column advances and a return connection for serially forming for all successive recording elements, between the presence of said member in two successive column positions, on the basis of said starting condition signal and the relevant row advances and column advances, an address which is composed of first and second sub-address signals, in said character generator, assisted by the first sub-address signal supplied by said buffer memory, and to regenerate said starting condition signal at the end of the series with an additional unit of column advance in said first direction until a detection circuit detects an end condition signal so that a line of characters has been printed.

2. Description of the Prior Art

A control device for a matrix printer of this kind is disclosed in U.S. Pat. No. 4,024,506, which is incorporated herein by reference. Known recording devices are subdivided mainly into two categories. One category includes high-speed printers comprising a large number of printing elements which instantaneously produce a character and which are arranged, for example, on a drum which rotates at a high speed tangentially to the paper. On the other hand, slower devices are known in which a next column of a character is recorded, by a series of printing styli which are arranged in the column direction. The recording device disclosed in said patent combines serial and parallel methods, so that a device which is intermediate as regards price and performance is obtained. Recording devices of this kind can be connected to an output of a computer and form so-called "hard copies" which can be temporarily stored and which can be read again at a later stage, if necessary, by the users, or can be applied to an optical reader for renewed input into a computer memory or for other processing or use. The dimensions of the character field (font) to be used constitute an important design parameter. On the one hand, large characters are properly legible to humans and can be easily recognized by a reader. On the other hand, in order to save on the cost of paper, to save storage space and, moreover, to increase the ease of handling, a small paper format is desired, for example, the format DIN A4 which measures approximately 296×209 mm. However, a large number of characters per line are still required.

SUMMARY OF THE INVENTION

The invention has for its object to increase the usability of the described control device for a matrix printer in this respect. The invention also has for its object, in the case of use of different carrier widths, to enable a large quantity of data to be provided per line by adaptation of the character dimensions and/or spacing-on-the-line to the sheet width. It is a further object of the invention to enable variable data density (number of character per unit of length of the line), without the kinematic control of the recording elements having to be changed. This is realized by changing the appearance of the characters. It is a further object of the invention to enable random use of large and small characters, for example, to record given paragraphs or captions in relatively larger characters. It is a further object of the invention to enable, when the character dimensions change, a constant line length to be maintained so that a neat lay-out of the sheet can be obtained. The invention also has for its object to record properly legible characters.

The objects of the invention are achieved in that the character generator comprises at least two sets of characters having mutually different dimensions of the character-including-spacing-on-the-line field, the chaining unit having at least one separate mode position for each relevant character set, the measuring means being connected to an input of a starting memory in order to activate per character set at least one starting condition signal stored therein for each character set for the chaining circuit, so that the number of characters recorded per unit of line length can be adjusted under the exclusive control of the relevant mode positions. The above-cited patent teaches a known device on which already comprises a chaining unit in accordance with the foregoing. This known unit is characterized in that the column jump or advance between successive recording elements always amounts to exactly three characters (=42 columns), while the row jump or advance always amounts to one row. As a result, this chaining unit can be very simply realized with counters. One character counter is provided, each third character is counted in the buffer memory, increasing the position of a row counter by one in order to address the character generator. A device of this kind cannot be adjusted for another dimension of the character field. Therefore, it is a further object of the invention to provide a recording device in which the column jump or advance between successive recording elements covers a broken number of character fields. In accordance with the invention, the chaining unit contains the row advance and column advance signals as required, by storage in a read only memory. In given circumstances this may require more memory capacity than the increasing of a counter position by only one unit. Each set of characters may have its own starting condition signal, as will be described hereinafter.

It is to be noted that the invention does not relate to the availability of two sets of characters per se having the same dimensions. In that case, for example, Latin and Cyrillic writing could be alternately recorded. The invention provides methods of recording, in a recording device as described, sets of characters of different format (with or without different symbol value as regards Latin/Cyrillic writing). The sets of characters can also concern on the one hand alphanumerical information and on the other hand numerical/mathematical symbol information. The invention, however, relates only to the format of the character fields.

Preferably, for at least one of said at least two character sets at least two mode positions are present in order to adjust, for the same character shape but with a different spacing-on-the-line, the number of characters recorded per unit of line length. For a large variation in the width of the character plus space on the line, the height will also be advantageously adapted; if said variation is small, it is sufficient to adapt the dimension of the spacing on the line. In this case a simple character generator suffices.

Preferably, there is provided a driving device which comprises a mode input which is to be activated parallel with said mode position in order to adapt the line height to the character width. Thus, on the one hand paper can be saved in two directions, while on the other hand the lay-out of the sheet of printed information is improved.

BRIEF DESCRIPTION OF THE DRAWINGS

The invention will be described in detail hereinafter with reference to the following figures.

DETAILED DESCRIPTION OF THE INVENTION

Figure 1:
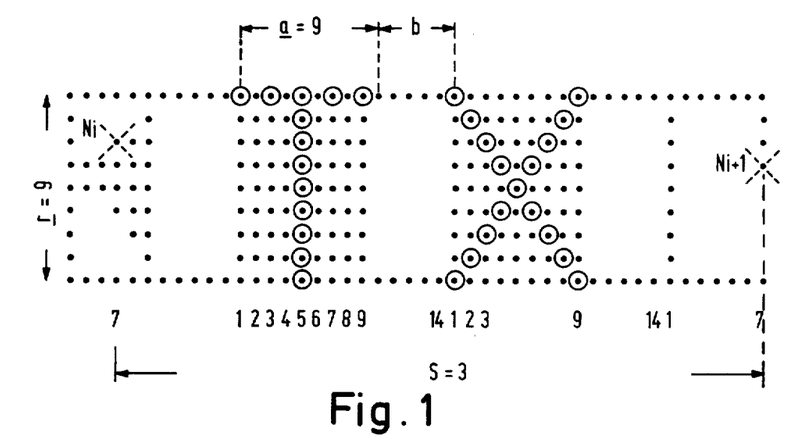
FIG. 1 shows a part of a line for a first size of character.

FIG. 1 shows a part of a recorded line for a first size of character. The height of the line is determined by the number of rows r constituting a character; in this example $r=9$. In the line direction, the character has a largest width of a point-shaped or line-shaped elements, referred to as "dots" for the sake of simplicity; in this example $a=9$. Successive characters are separated by a spacing region having a width of b dots; in this case, $b=5$. The values of r and a need not be the same. Some character sizes within a set of characters may be narrower than a dots; this may be the case for the letter I. On the other hand, a character having a width in excess of 9 dots need not be excluded; in that case, the spacing is accordingly narrower. Characters each time succeed each other with a period of $a+b=c$ dots; in this example, $c=14$. The characters T and X shown comprise straight and oblique lines, respectively. In this example, the column advance between two successive character elements amounts to two columns for a horizontal character stroke. For an oblique character stroke, it amounts to only one column, but this is not a restriction. FIG. 1 furthermore shows the relative position of two recording elements relative to a line of text to be recorded; Ni and Ni+1 are the projections of two recording elements of a group of recording elements of the member which can be driven in the line direction. In this example, the recording elements are arranged to be staggered over one row relative to each other; the sign of the row staggering is a design parameter. The elements are arranged to be shifted over a distance of s character fields in the line direction relative to each other; in this example, $s=3$ which corresponds to 42 dots.

Figure 2:
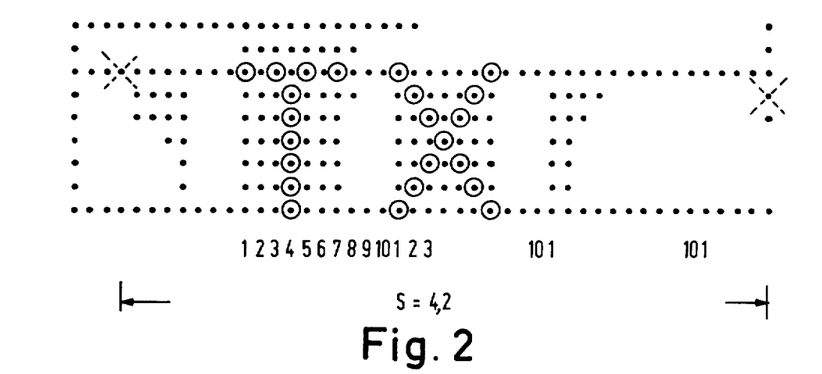
FIG. 2 shows same for a second size of character.

FIG. 2 is a corresponding view of capital characters of a line, recorded in the same recording device, for a second character size. The character height now amounts to 7 dots, the maximum width $a=7$ dots and the width of the spacing $b=3$ dots. The distance between the recording elements and the distances between successive dots are invariant properties of the recording device. The distance between the two recording elements thus amounts to 42 dots again, which corresponds to $s=4\ 1/5$ character fields. In this example, the upper two rows of dots are not used for the display of character information. In given cases it is advantageous to make the bottom line for such capital characters coincide with (in this case), the seventh row. The two further rows can then be additionally used for such lower-case characters which project underneath the line (for example, j, p, q, y).

Figure 3:
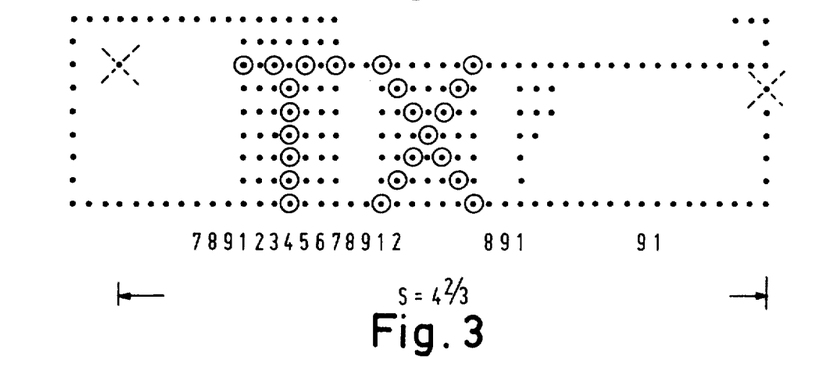
FIG. 3 shows a modification of FIG. 2.

FIG. 3 shows a line recorded by means of the same recording device for the character size shown in FIG. 2, the spacing having a width $b=2$ dots. The distance between the recording elements now corresponds to $s=42/9=4\frac{6}{9}$ character fields. The FIGS. 1-3 merely show examples. For example, a narrower spacing can be used in FIG. 1 (or a wider spacing). On other hand, use can also be made of a narrower character region, for example, covering five dots. Generally, odd character widths are used, the vertical stroke of the T then being disposed for example, symmetrically, but this is not a restriction. The advantage of the set of characters (not completely shown) according to FIG. 1 consists on the one hand of the increased legibility, while on the other hand it is possible to introduce many different details for the characters, such as punctuation marks, accents, differences between the letter S and the digit 5, and the like. On the other hand, the characters shown in FIGS. 2, 3 often have adequate legibility and they require substantially less space. The distance between two character elements which are to be recorded in direct succession in the horizontal direction in this case amounts to two columns; this distance is determined by the kinematic properties of the character element, of its driving, and of the transport speed in the line direction of the drivable member. The speed of determination of the dot information (see hereinafter) should be adapted thereto. The recording element may have an arbitrary construction, for example, comprising a movable printing stylus, a non-impact generator for ink splashing, an electrostatic printing element or otherwise. The character elements may be shaped as dots, but may also have the shape of a stroke with a height/width ratio of 2:1, or otherwise.

Figure 4:
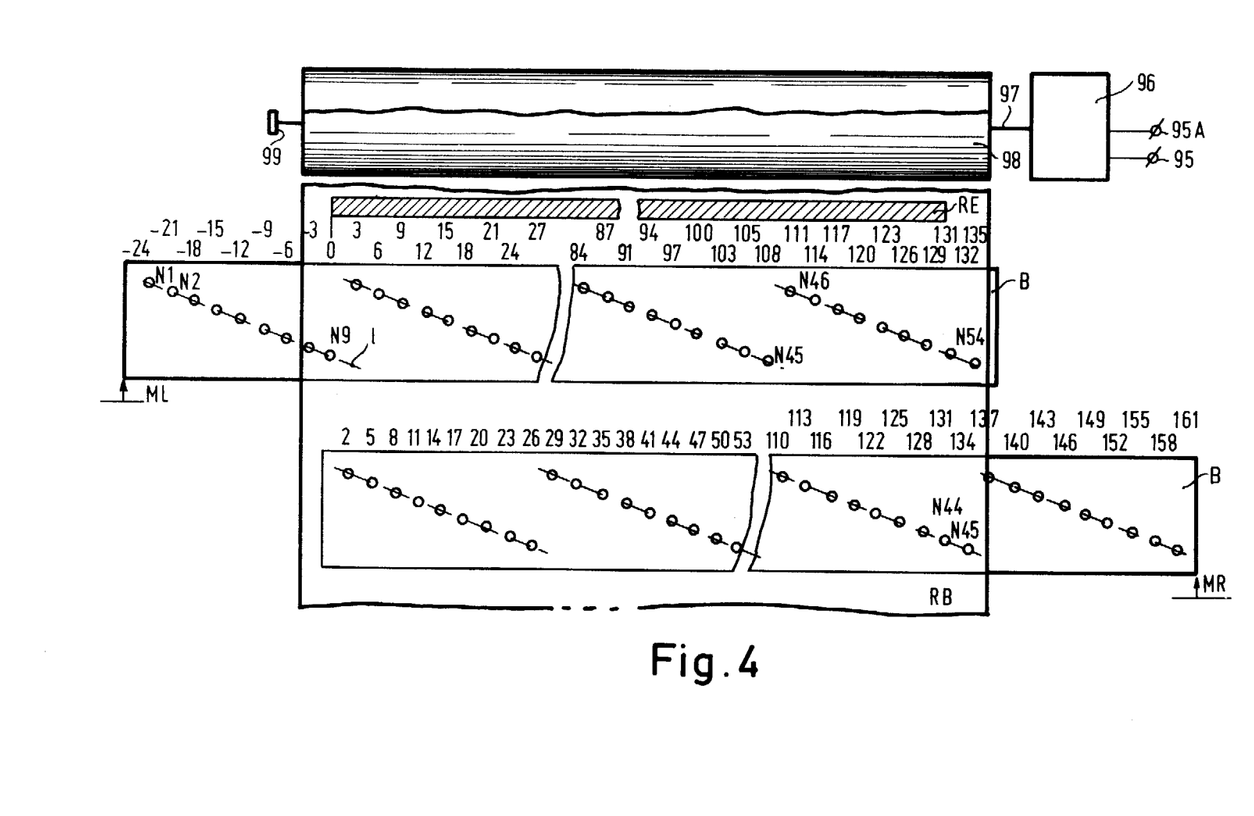
FIG. 4 shows a recording device in accordance with the invention, together with the movable member and drive elements.

FIG. 4 shows a recording device in accordance with the invention. In the upper half of the Figure, the member B which is movable in the line direction is shown in an extreme position ML (extreme left), while in the lower half it is shown in the other extreme position MR (extreme right). The recording sheet RB is diagrammatically shown. It can be driven by a motor 96 which may be a step motor or servomotor and which can receive a step control signal on the inputs 95, 95A. Via a shaft 97, journalled in the bearing 99, the step motor can drive the drive roller 98 which takes along the recording sheet. The sheet with the completed recording is thus transported to an output device not shown; the invention does not relate thereto. The bar RE indicates the line width, which is the region in which characters are to be recorded. The member B in this case comprises the recording elements N1, 2 ... N54. Thus, there are 54 diagrammatically denoted recording elements which are sub-divided into six groups of nine elements each. In this example, each element within a group covers its own row. If the number of elements per group is larger, larger characters may be recorded (for example, up to a height of 12 rows). For the set of characters shown in FIG. 1, the line width to be used covers 132 characters k=0,1 ... 131. This number is commonly used nowadays in recording devices of this kind, but does not represent a restriction. In this example, the column advance between successive recording elements amounts to 42 columns, which means s=3 character fields in FIG. 1 (including-spacing-on-the-line). The nine recording elements of the group are arranged on a line 1 which describes an acute angle with the line direction; for an arrangement of this kind, this angle is substantially always smaller than arctg 1/10. However, other arrangements of a group of recording elements are also within the scope of the invention example, a group may consist of two sub-groups of 5 and 4 recording elements which serve the odd and the even lines, respectively. Each sub-group then forms a line-like row which is arranged at an angle. A line of text in this case consists of at most nine rows; the relevant recording elements then each time coincide with one row (in the examples nine and seven rows, respectively); any remaining elements are not used. In the extreme left position ML, the member B partly extends beyond the left edge of the sheet RB. In order to enable all characters of a line to be recorded during only one movement of the member B from the position ML to the position MR, the device must be constructed so that all possible recording locations of a line are passed by at least one recording element. On the basis of the example shown in FIG. 1, a given number of recording elements N1, N2, ... N54, in relationship with the described parameters s and r and the number of characters 0, 1, 2, ... 131 per line, a choice can be made as regards the positions of the recording elements in the one and in the other extreme position of the member B. In the example shown in FIG. 4 the choice is such that in the position ML, the recording element M9 is just in the position of the first column of the 0th character of the line. For s=3 and r=9, the further situation has then been shown. The recording elements N8, N7, ... N1 are then situated opposite the positions of the fictitious characters −3, −6, ... −24. Proceeding to the right along the member B, each of the recording elements is arranged opposite a character position. For example, N46 is arranged opposite character 111, and N54 opposite character position 135. In this example, a line comprises 132 character positions and the recording elements N53, N54 may be omitted, if desired. Thus, incomplete groups of recording elements can occur within the scope of the invention. On the other hand, within the scope of the invention said two additional recording elements could be used for recording a number of 138 characters on one line by means of the set of characters shown in FIG. 1. This extension will not be elaborated herein. When the member B moves to the right, first the first, the second, etc. of said character positions is passed in succession, up to and including the 14th column, after which a next series of character positions (one further, so element N1 opposite −23, N2 opposite −20, ..., N9 opposite 1, ... N54 opposite 136) is reached. Thus, during the displacement to the position MR all character positions 0–131 are passed. In the position MR, the recording element N1 is opposite the last column c=14 of the character position 2, the first column c=1 of the next character position has been recorded in the position ML (if necessary) by the recording element N10, the first recording element of the second group. Furthermore, in the position MR the recording element N45 is arranged opposite the fictitious character position 134 etc., N54 opposite the character position 161. In view of the foregoing, it will be clear that when the member B moves from the right (MR) to the left (ML), all character positions 0–131 are completely passed again, so that, if an adequate control is provided, a further complete line of characters can be recorded during the returning of the member B. When a new line is recorded, the sheet will have been transported to a next line position.

For the described arrangement, other starting situations can also be chosen. For example, assuming the presence of 54 recording elements, in the position ML, the recording element N54 may be situated opposite the position of the character 129. N46 is then opposite the character position N105, N9 opposite −6, etc. In the position MR, the situation is so that N54 is opposite the character position 155. N46 has then just reached the character position 131. N1 is then opposite character position −4. All relevant recording points of a line have then been passed again. In the case of the said choice of 132 characters on a line, the recording elements N1, N2 would be superfluous. Between said extreme choices for the starting position as many possibilities exist as there are columns.

When the first-mentioned choice for the position ML is adhered to and use is made of the character set shown in FIG. 2, the recording element N9 is at the column 1 of the character 0 in this position ML; N10 is at the column 3 of the character 4, N11 is at the column 5 of the character 8, N12 is at the column 7 of the character 12, N13 is at the column 9 of the character 6, N14 is at the column 1 of the character 21 (the column 11 does not exist), etc. Until N54 is situated $45 \times 42 = 1890$ columns further than N9, so at column 1 of the character 189. In this example this character is in any case fictitious. The choice of the largest number of characters on the line (in this case 0 ... 188 = 189) is inter alia determined by the format of the paper; for this set of characters it is furthermore determined by the extreme right working position of the recording element N46 (the first one of the last group of nine), and this is 41 columns further to the right than the said extreme left working position of the element N54. Furthermore, in the position ML the recording element M1 is at column 5 of the fictitious character $-34$. In the position MR, the recording element N1 is at the column 2 of the character 4 (one column further to the left than the recording element N10 in the position ML) etc., until the recording element N54 is opposite the column 8 of the fictitious character 225.

In the case of the character set shown in FIG. 3, in the position ML, the recording element N9 is opposite the column 1 of the character 0 again, the recording element N10 is opposite the column 7 of the character 4, the recording element N11 is opposite the column 4 of the character 9, the recording element N12 is opposite the column 1 of the character 14, the recording element N13 is opposite the column 7 of the character 17 etc., until the recording element N54 is situated 1890 columns further than the recording element N9, so at the column 1 of the character 210. On the one hand, the use of this character may be omitted, while on the other hand the last column to be used is situated 41 columns further, so that in principle 214 characters could be recorded. In the position ML, furthermore, the recording element N1 is at the column 7 of the fictitious character $-38$. In the position MR, the recording element N1 is at the column 6 of the character 4 (one column further to the left than the recording element N10 in the position ML) etc., until the recording element N54 is opposite the column 9 of the fictitious character 251.

For the sets of characters according to the FIGS. 2, 3, the starting and end positions may also be defined in another manner. From the position of the recording element N1 in the position ML, a starting condition signal can be determined. The positions ML, MR need not be the mechanically extreme positions of the movable member; generally, the reversing movement will be effected by deceleration and re-acceleration in the opposite direction of a carriage on which the movable member is mounted. During the deceleration and acceleration, the motor 96 can receive a step control signal on its input 95, while the recording process is temporarily interrupted in that the movable member is situated to the left of the position ML or to the right of the position MR.

Figure 5:
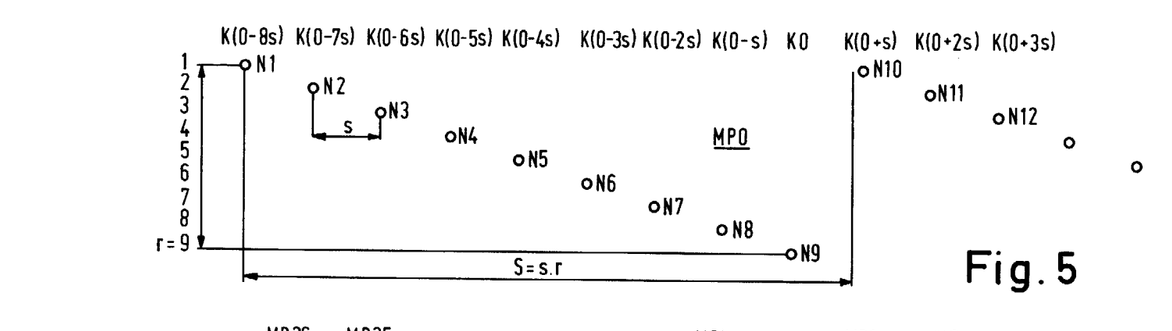
FIG. 5 shows a group of recording elements.

FIG. 5 shows a group of recording elements of the member B in the extreme left position MP0. During a movement stroke, an interval is completed which corresponds to 378 dots in this example, as in the example of FIG. 1, to 27 character fields MPi (i=0 ... 26). In the example shown in FIG. 2, 378 columns (dots) correspond to $37^4/5$ character fields; in the example of FIG. 3 they correspond to $42^1/9$ character fields.

Figure 6:
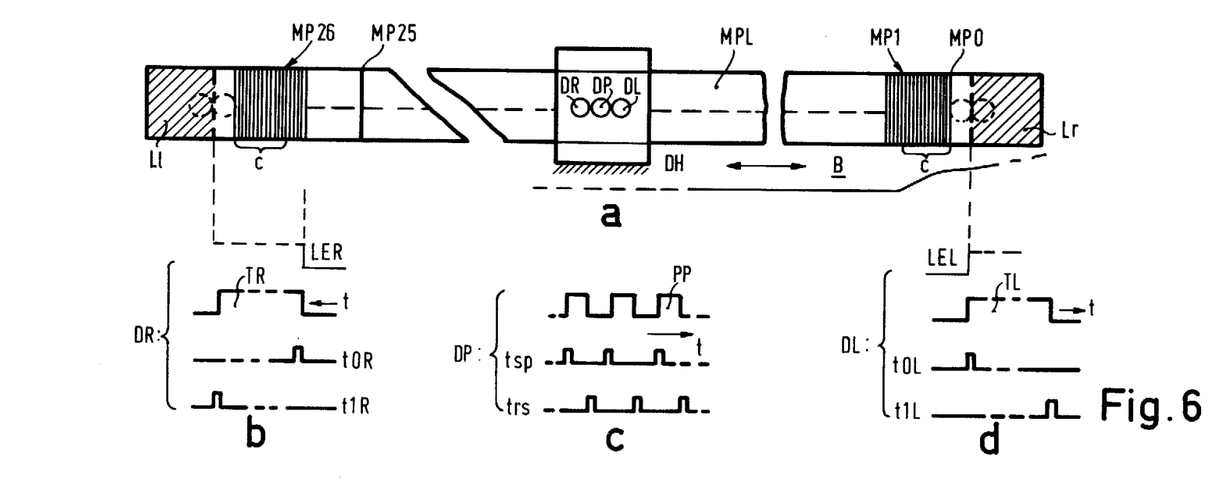
FIGS. 6a through 6d show details concerning the derivation of signals.

FIG. 6 shows details with respect to the derivation of signals, and notably how the link between the mechanical system and the control system can be realized. MPL is a position ruler provided on the movable member B. On the ruler there are provided primary position strokes MP0, MP1, ... MP26, followed by 12 secondary strokes which are shaped like the "primary strokes" which mark a next character field of the set of characters shown in FIG. 1. For each position MPi, therefore, there are 14 strokes which are shifted over one column; this, there are 378 strokes in total. On the right of the ruler MPL there is a portion Lr which is completely "black." Similarly, on the left there is a portion Ll which is also completely "black." There is also provided a photocell detector holder DH which is mounted on the body of the recording device (not shown).

In this example, there are three photocells DR, DP and DL which pick-up signals from light transmitted by the transparent ruler. Furthermore, the detectors derive the following signals: detector DP supplies a position pulse PP for the passage of each stroke on the ruler. The leading edges provide pulses tsp and the trailing edges supply pulses trs (this will be described hereinafter). When the member B arrives in the one extreme position, the left portion of Lr passes the detector DL; this indicates that the extreme position has been reached: line-end-left: LEL (compare position ML of FIG. 4). This results in a signal TL which terminates again at the instant at which the member B passes the boundary of the portion Lr again during its movement in the other direction (going to the left in the drawing). From the leading edge of TL a signal t0L is derived, while from the trailing edge a signal t1L is derived. The same takes place when the member B lets the portion Ll pass the detector DR in the other extreme position: line-end-right: LER (compare position MR of FIG. 4). Signals are also derived from the time pulse TR which lasts as long as Ll is within the range of DL:t0R ("entering" the portion Ll) and t1R ("exit" from the portion Ll). The signal data required for the control device in accordance with the invention are thus available. During said signals TL and TR, the control of the movable member is also active: after t0L and t0R, braking, stopping, reversal of the movement and re-acceleration of the movable member take place. The correct speed has been reached again at t1L and t1R.

Figure 7:
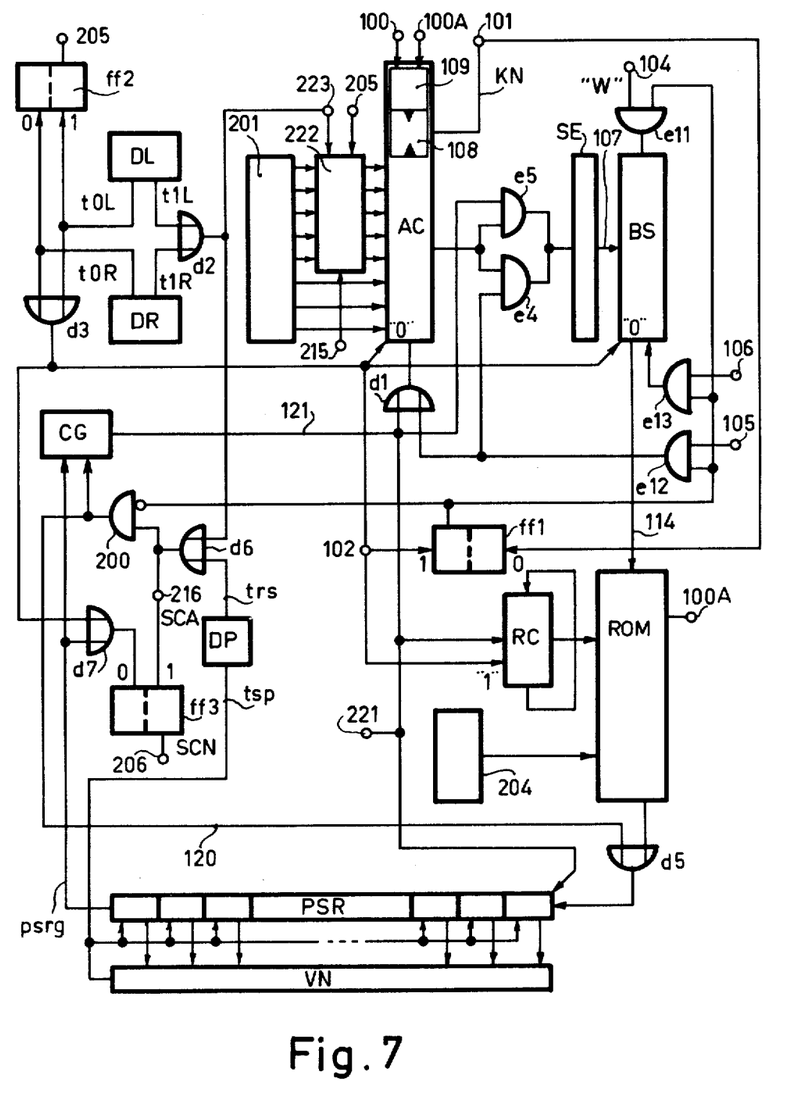
FIG. 7 shows a control device circuit in accordance with the invention.

FIG. 7 shows a part of a control device circuit to be used in accordance with the invention, comprising inter alia a line memory BS, a character generator ROM, a dot memory PSR, the three detection devices DL, DR, DP, a clock generator CG, devices for loading the line memory with the characters to be recorded, and a chaining unit for serially retrieving during the displacement of the movable member over one column distance, dot data for the dot memory for all recording elements.

The driving of the reciprocating movement of the movable member is independently realized by means of a drive element not shown, the stroke extending further on both sides by an amount which corresponds at least to the width of the part of the recording sheet on which characters are to be recorded. As has already been stated, a number of control signals are generated on the basis of this movement by optical detection. When the end of a line is reached, one of the two detectors DR, DL supplies the signal t0R or t0L, respectively, so that the OR-gate d3 supplies a signal which appears as a request signal on the terminal 102 for a data source, for example, a central processor, in order to signify that data are available. Furthermore, signal of the OR-gate d3 sets the flipflop ff1 to the "1" position, so that the AND-gates e11, e12, e13 become conductive, sets the flipflop ff3 to the "0"-position, so that the signal SCN on the terminal 206 becomes logic "0" to indicate that an arithmetic phase has been completed, sets the address counter AC (input "0") to the zero position, and erases the data in the line buffer BS so that the latter is released for the storage of a new line of characters. The signal on the terminal 102 can be supplied to the motor 96 of FIG. 4, so that the motor advances the recording sheet over one line. Said central processor then performs the "master" function. The signal on the terminal 206 is applied to the element 201 of FIG. 8, so that this element supplies seven logic "0" signals and one logic "1" on the terminal 212, being the least-significant bit for the incrementation of the address counter AC. If said central processor unit then has information available for recording, the processor supplies a write signal "w" to the iput 104 of the AND-gate e11, and furthermore in synchronism a counting signal to the input 105 of the AND-gate e12, and character signals to the input of the multiple AND-gate e13 in order to conduct the characters, which consist, for example, of a six-bit or seven-bit binary code, to the line memory BS. The memory BS is a normal random access memory (RAM) for reading and writing and has in this example a capacity of 256 words of seven bits and addressing by 8 bits. One character of a set of 128 characters can be stored in each word position of the line memory. The output signal of the AND-gate e12 renders the AND-gate e4, in this case having an eight-fold construction, conductive, with result that the contents of the address counter AC appear in the selection elementSE in order to address, via lines 107, a word position in the memory BS in which a binary word which represents a character and which is supplied via the gate e13 is written. The incrementation of the address counter AC is realized in that the output signal of the AND-gate e12 activates the address counter AC via the OR-gate d1. Under the control of its own position and of the single logic "1" on the terminal 212 between the logic zeroes of the other outputs 207-214 of the element 201, the position of the address counter AC is then increased by one unit. To this end, the address counter operates as a known accumulator register, the outputs of which are formed by eight flipflops which are activated by the gate d1 (possibly after a small delay), and the outputs of which are coupled to the inputs of the address counter AC. An example of such a coupling will be given with reference to the elements 203, 204 of FIG. 8. In order to synchronize the writing, the memory BS may receive further clock pulses (not shown), for example, clock pulses alternating with those on the terminal 105. Furthermore, on the terminals 100, 100A a two-bit selection signal appears from the central processor unit, said selection signal indicating the set of characters to be chosen from those shown in FIG. 1 (selection signal 10), FIG. 2 (selection signal 01) and FIG. 3 (selection signal 11). The terminal 100A may be connected to the terminal 95A for adjustment of the step magnitude of the motor 96; it carries a "0" only in the case of FIG. 1. If the set of FIG. 1 is selected, at the most 138 spacings/-characters can be accommodated on one line; if that of FIG. 2 is chosen, there are at the most $138 \times 14/10 = 193 \ 1/5$, which is rounded off to an even number of 192; in the case of the set of FIG. 3, there are $138 \times 14/10 = 214 \ 6/9$, rounded off to 214. These numbers are stored in the storage element 109 of the address counter, a data output of said storage element leading to the comparison element 108, together with the output of the address counter AC which indicates the counter position. The characters supplied via the multiple terminal 106 are stored in the buffer (line) memory BS as from the address "0," i.e. at the most up to and including the relevant addresses 139, 191 and 213, or any previous addresses under suitable control. The other addresses can contain, if necessary, other data which may be recognizable by an additional bit. The word width must then be at least eight bits. If the comparison element 108 detects correspondence, no further data may be supplied: the element 108 then resets, via the line KN, the flipflop ff1 to the "0" position, with the result that the AND-gates e11, 12, 13 are blocked. The terminal 101 is also connected to the central processor unit in order to conduct an O.K. signal, so that this unit is then available for other tasks. This blocking signal acts as a safety, so that no characters are lost, not even if the processor unit itself had not taken steps for the geometrical programming (lay-out) of the data. In many cases it will take such steps and fill lines with spacing characters. On the other hand, it is also possible for the signal on terminals 100(A) to activate the same value (for example 131) for all character sets according to the FIGS. 1, 2, 3 in the storage element 109. A constant number of characters per line offers the advantage that, when a different character format is chosen, no renewed lay-out of the data need take place. A variable number of characters per line offers the possibility of optimum use of the capacity of the recording sheet. The "1" signal of the flipflop ff1 is supplied in inverted form (circle) to the AND-gate 200, so that any output signal of the OR-gate d6 is blocked, with the result that all operations relating to the actual recording are interrupted. In many situations this protection against accidental starting of the calculating phase to be discussed hereinafter is superfluous, but if the central processor unit can be switched over by an interrupt signal of higher priority, an error is thus prevented. After the signal on the terminal 101, the data of a new line are present for recording. On the other hand, it is also possible for the buffer store BS to be always filled for each new line with the characters to be printed, for example, 132 and is filled for the remainder with spacing characters, the signal on the line KN then occurring only in the position 255 as an output carry signal; the further filling with spacing characters can then be effected by said processor unit. Thus, in that case the elements 108, 109 can be dispensed with, but slightly more time is required.

The procedure for the actual recording will be described hereinafter with reference to FIG. 8 which shows details of the arithmetic circuit. The device in accordance with FIGS. 7/8 now itself performs the "master" role, notably if the clock CG is started by a signal from the AND-gate 200. The two bits on the terminals 100/100A of FIG. 7 which indicate the set of characters are also supplied to the circuit of FIG. 8 which mainly comprises three programmable read-only memories (PROM) 201, 202, 203 and a module 204 comprising four data flipflops. The read-only memory 201 forms a starting and end position memory as will be explained hereinafter, and provides the advancing of the address counter AC as explained for the writing phase, during which the increase amounted to only one unit each time. The circuit shown in FIG. 7 furthermore comprises pulse-generating detector devices DL, DR, DP, on the outputs of which the signals t0L, t1L, t0R, t1R, trs, trp appear, said indications also being used to denote the relevant outputs. At the end of a line (t0L or t0R), the signal on the terminal 102 also sets the four data flip-flops 204 to the zero position. This zero position (0000) has the property that no further elements are activated by the lines CC0 . . . 3. Furthermore, the flipflop ff2 is set from the one to the other position (when the movable member correctly passes the detector), so that the signal on the terminal 205 indicates the movement direction of the movable member during the next line to be recorded: the logic "1" indicates, for example, a movement from left to right. This signal is supplied to the chaining unit of FIG. 8. Furthermore, the signal from the OR-gate d3 has also set the row counter RC to a starting position: in the arrangement shown in the FIGS. 4–5, this was the "1" position, because the recording element N1 corresponds to the row 1 (the upper row). At the beginning of the next line (after the stopping and re-acceleration of the movable member) either the signal t1L or the signal t1R appears, so that the OR-gate d2 supplies a signal. This signal indicates the beginning of the first arithmetic phase in order to arrive at the recording of a line. The signal of the gate d2 is supplied to the OR-gate d6. The output signal of the gate d6 on the terminal 216 (SCA) signals the beginning of an arbitrary arithmetic phase which is required in order to realize the recording of a line of characters. The signal of the gate d6 is supplied to the elements 202, 203 of FIG. 8 (this signal appears once per column displacement, as will be explained hereinafter, while the signal on the terminal 223 appears only once per line of characters). Furthermore, the signal of the OR-gate d6 sets the flipflop ff3 to the "1" position, the putput signal of said flipflop being supplied, by way of the terminal 206, to the element 201 of FIG. 8 for as long as the relevant arithmetic phase for the recording of the line of characters has not been completed. Under the control of the signal of the OR-gate d6, conducted by the AND-gate 200, the clock pulse generator CG is started and subsequently supplies clock pulses at regular intervals until it is stopped by the signal on the line psrg. The starting pulse of the AND-gate 200 reaches, via the line 120 and the OR-gate d5, the dot memory psr in which it is stored under the control of the first clock pulse appearing. The clock pulses are supplied to the address counter AC, via the line 121 and the OR-gate d1, and to the four data flipflops 204 of FIG. 8 via the terminal 221. Finally, said clock pulses are also supplied to the row counter RC in order to increase the position thereof by one each time.

Figure 8:
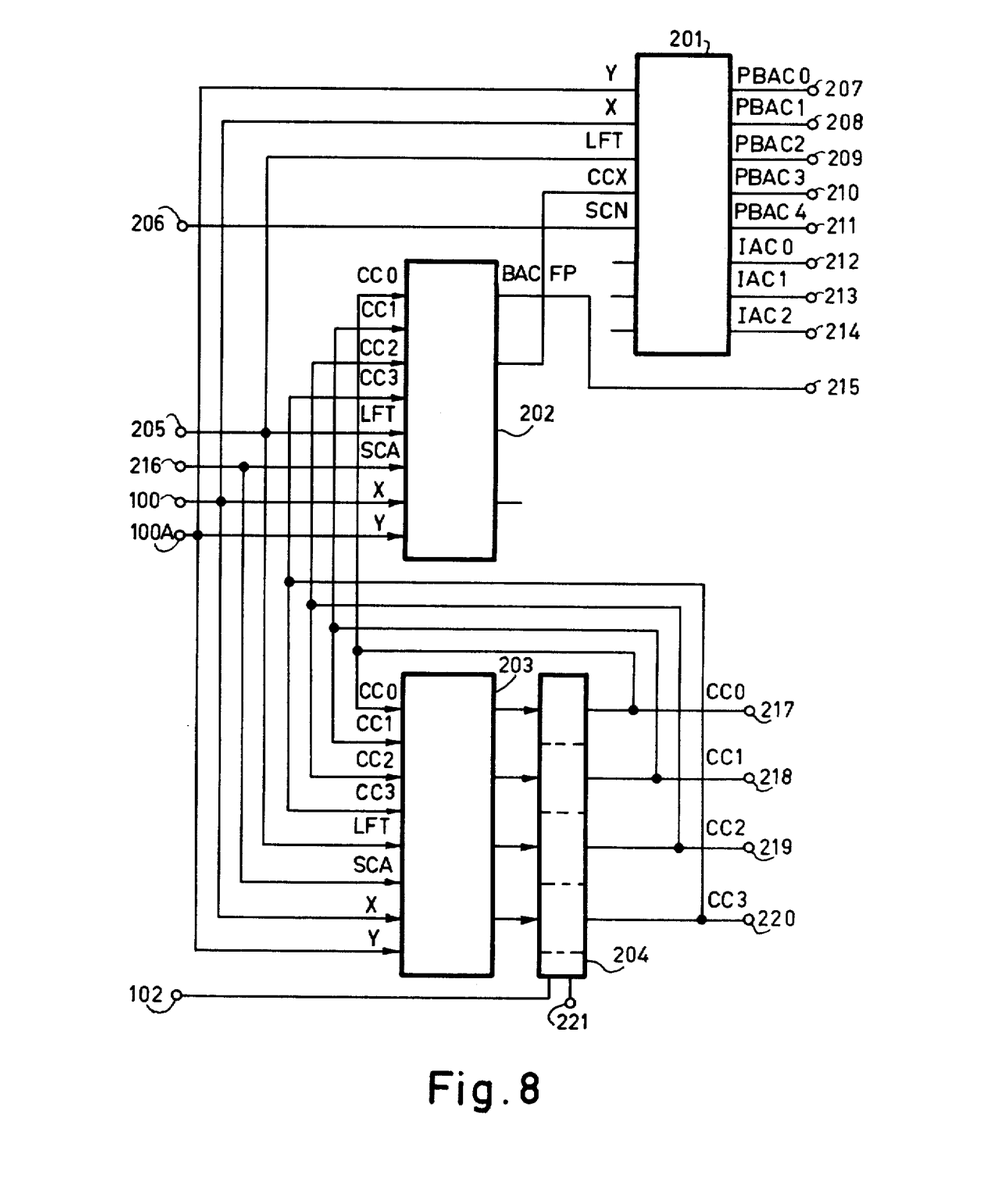
FIG. 8 shows details of FIG. 7.

At the beginning of the recording of a line of characters, the address counter AC, the chaining unit of of FIG. 8, including the column counter, and the row counter RC must be preset in order to supply the correct data to the dot memory. The row counter RC has already been set to the position "1"; the column to be addressed is dependent of the set of characters chosen, and the addresses are as follows in the present embodiment:

FIG. 1: character −24 column 1
FIG. 2: character −34 column 5
FIG. 3: character −38 column 7

Figure 9A:
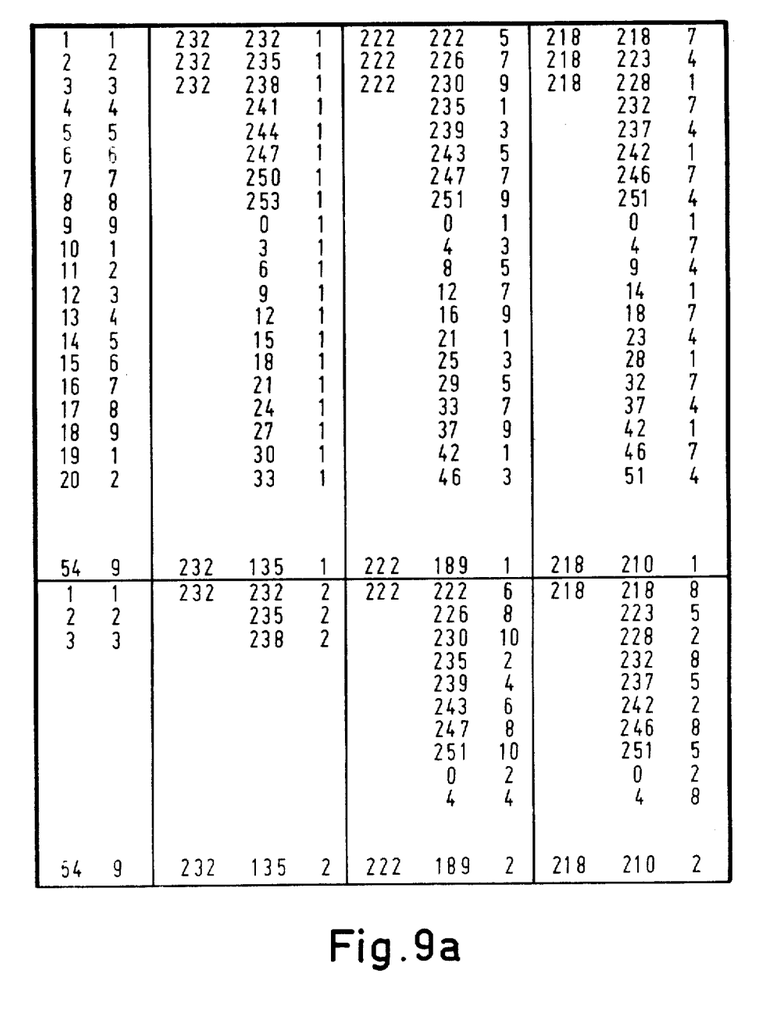
FIGS. 9a and 9b show the working sequence.
Figure 9B:
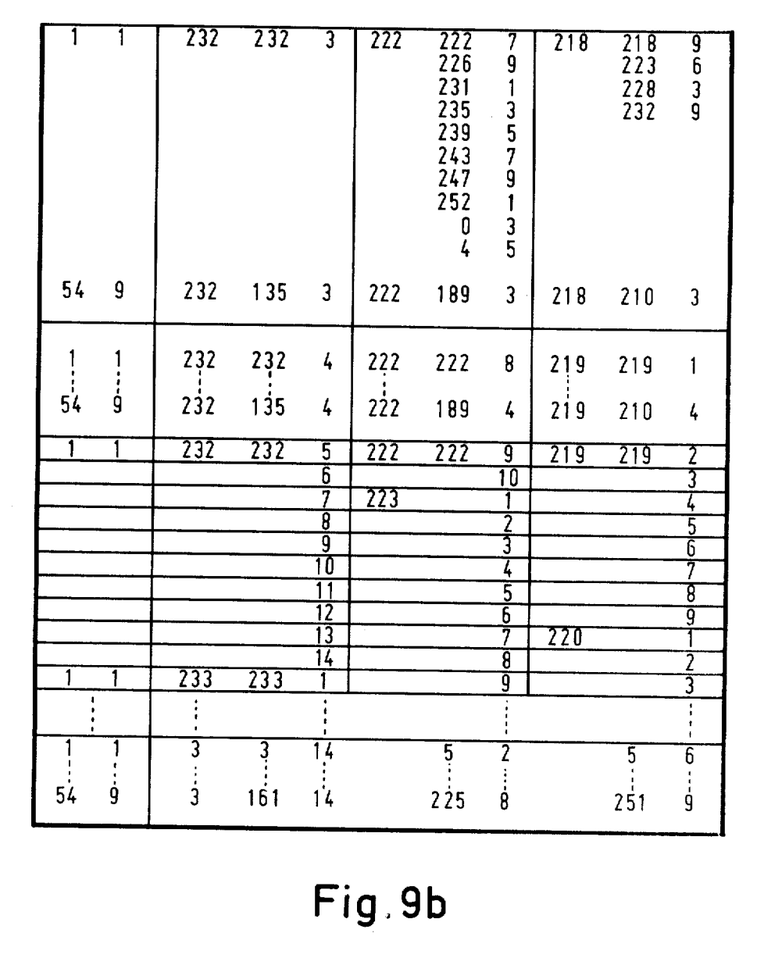

FIG. 9 is an accurate survey of the various addresses to be formed. The first column cyclically provides the numbers of the recording elements 1 . . . 54. The second column provides the number of the recording elements within a group of nine elements, so cyclically 1 . . . 9 (thus, this corresponds to the row to be addressed). The third, the sixth and the ninth column provide the starting positions 232, 222 and 218, respectively, for which said negative address values are noted as their 256-complement; thus, this concerns the address of the first recording element. The fourth, the seventh and the tenth column provide the address positions for all relevant recording elements, expressed in character positions; the fifth, the eighth and the eleventh column each time indicate the character column to be addressed. For the character set of FIG. 1, the spacing between two successive recording elements thus amounts to exactly three characters; in FIG. 2, this spacing amounts to four characters plus two columns; in FIG. 3, the spacing amounts to four characters plus six columns. The column numbers extend from 1 to 14, 10 and 9 respectively.

After the first horizontal stroke, the first cycle of 54 recording elements has been completed, and the recording element has been shifted over one column; thus, in this sequence over one column to the right: all column numbers are then one unit higher, except if overflow occurs. Such an overflow occurs, however, for the first time only after the second horizontal stroke in the figure (second shift): in the seventh/eighth table column, line 3, the character 230/column 11 does not exist, and the valid address is therefore: character 231, column 1, and so on. The movable member moves over 42×9=378 columns. The last addresses to be formed are: character 161, column 14 (last column) character 225 (column 8), and character 251 (column 9), respectively. The last addresses to be recorded are reacted earlier and are determined each time by the extreme position of the recording element 46 of the series 1 . . . 54, or as much earlier as this recording element would correspond to the last non-spacing column, but this is ignored. Thus, this concerns the addresses of the character 137, column 14 (last), character 189, column 10, and the character 210, column 9, respectively. It thus appears that for the described capacity of the buffer memory (256 word position) no interference can occur between characters which are to be recorded during one operation, i.e. if the movable member is in a rather right position relative to a "high" character number, while during an other operation they are not to be recorded, i.e. if the movable member is in a rather left position with respect to a negative character number, the 256-complement of which is thus addressed. The total number of addresses to be generated for the character generator ROM (for possibly unused character positions), therefore, amounts to 54×378=21412 for each forward or return stroke of the movable member. The complete synchronization of the address calculation in the device shown in FIG. 7 is realized by the clock pulse generator CG which is started by an output signal of the OR-gate d6, via the AND-gate 200, and which is stopped by an output signal psrg of the dot memory psr. In the time interval therebetween, the generator CG supplies clock pulses on the line 121 at a frequency which is high enough to generate dot data for all recording elements N1 . . . 54 between the output signal of the OR-gate d6 and the first following signal trs of the detector DP and also between two successive signals tsp of the detector DP. Under the control of the pulse signal SCA on the terminal 216 and the clock pulse on the terminal 212, and co-addressed by the signals on the terminals 100, 100A (character set) and the terminal 205 (movement direction of the movable member), the element 203, being a preprogrammed read-only memory, supplies a four-bit signal which is immediately stored in a synchronized manner in the four data flipflop 204, and which is applied to the element 202, also being a preprogrammed read-only memory, and, by feedback, again to the element 203. The latter has no effect without further clock pulse. The four signals appearing on the output terminals 217-220 of the data flipflops 204 are applied as a column address to the character generator ROM, which is also a preprogrammed read-only memory. The character generator ROM also receives the output signal of the row counter RC which supplies a further sub-address for addressing the row address "1" first. The read-only memory 202 receives the same input signals as the read-only memory 203, and in this embodiment supplies a signal CCX (carry signal) to the read-only memory 202 and a preset signal BACFP to the starting address auxiliary memory 222, on the terminal 215. The read-only memory 201 receives the selection signals X, Y and LFT and also the carry signal CCX. The unblocking signal SCN continuously has the value "1" during an arithmetic phase. At the start of the first arithmetic phase of a line, the starting address auxiliary memory 222 is loaded with the data of the terminals 207-211 of the read-only memory 201, activated by the output signal of the gate d2. The first clock pulse via the line 121 and the OR-gate d1 loads the address counter AC directly with this starting address, so the character address −24, −34, −38 respectively, in the already described 256-complement notation. This address can then be loaded as five-bit code in the element 222 via the terminals 207-211, because only the 32-16-8-4-2 bits need be treated; the other bits are the same for all three presettings. The terminals 212-214 carry the incrementation data for the adjustment to a next recording element. The character address is applied, under the control of the first clock pulse on the line 121, via the multiple AND-gate e5, to the element SE which addresses the line buffer BS via the lines 107. The signal of the gate e11 is then logic "0," so that the line memory BS is read and the relevant data appear, via the line 114, as a further sub-address for the character generator ROM. The character generator ROM is a preprogrammed read-only memory in which the dot data of all feasible characters to be recorded are stored; thus, in the present example at least two sets of characters. The sets in accordance with the FIGS. 2, 3 can be stored together, because at least the actual characters (not the spacings) correspond. The selection from the sets is effected by the signal on the terminal 100A which is logic "0" for the character set of FIG. 1 and wich is logic "1" for the other two sets. The complete addressing of the character generator ROM, therefore, is effected by four address parts: the selection signal on the terminal 100A, the character address from the line buffer BS, the column address from the read-only memory/flipflops 203/204, and the row address by the row counter RC. The synchronization can furthermore be realized by additional clock pulse control via the line 121, but this is not shown for the sake of simplicity. If a character element (dot) is to be recorded on the recording sheet, a logic "1" appears on the output of the character generator ROM, otherwise a logic "0" appears. Via a logic OR-gate d5, these dot data are then shifted into a dot data register psr which is constructed as a shift register. The shift pulses for this shift register are derived from the line 121. Each clock pulse on this line thus reads a dot (or a void position) for the dot register psr, increases the row counter RC (being constructed as a ring counter), and fills the flipflops 204, so that modified column addressing is available and, under the control of the signals on the terminals 212-214 of the read-only memory 201, the position of the address counter AC is increased. In the case of the character set shown in FIG. 1, the address counter AC is increased each time by three (011); in the cases in accordance with the FIGS. 2/3, the address counter is alternatively increased by four units (100) or by five units (101). If the signal on the terminal CCX is logic "0," the lower amount is applicable. If the signal on the terminal CCX is logic "1," however, the higher amount is applicable. The signal sequence for this purpose will be described hereinafter. The address counter AC is always increased, because the filling of the dot memory is independent of the movement direction of the movable member.

Thus, all dots for the dot memory psr are successively formed and shifted therein. When all dots for the simultaneous activation of the elements N1 . . . 54 have been stored in the dot register psr, the additional "1" bit stored therein in first instance also appears (via the line 120) in the form of the signal psrg on the output, with the result that the clock pulse generator CG is stopped and the flipflop ff3 is reset to the zero position via the OR-gate d7. The row counter RC is then automatically in the starting position again, because all groups consist of nine recording elements. When the movable member arrives in the position in which the first column to be recorded is situated, a detector DP provides a suitable indication by way of the first pulse PP (FIG. 6), for example, of the stroke MPO on the ruler MPL. The leading edge pulse tsp then appears to ensure that the contents of the dot register psr activate, via the activation unit VN (which acts, for example, for each recording element as a pulse amplifier), all recording elements Ni for which a logic "1" was present in the dot register. Shortly thereafter, the trailing edge pulse trs of the detector DP appears, said pulse acting, via the OR-gate d6, in the same manner as previously described for the signal t1L/t1R arriving at this point. The signal SCA of FIG. 8 retrieves the previously valid initial column address again, be it increased by one in the direction of movement of the drivable member. If a carry signal or a borrow signal (the latter occurring in the reverse direction of movement) then appears, it is supplied, by way of the signal BACFP to the initial address auxiliary memory 222 which is then changed to the correct direction under co-control by the direction signal on the terminal 205. Subsequently, a new series of address calculations for the line memory and the character generator takes place. Thus, for each recording element there may be recorded 378 character elements (black or white). After the end of the last (378th) series of calculations and the associated recording, immediately the signal of the OR-gate d3 appears to grant permission for the renewed filling of the line memory BS. When the movable member is in the other direction, there are consequences only for the loading of the initial addresses: the read-only memory 203 retrieves a lower column address for each new column displacement; the read-only memory 201 once retrieves a different address for the initial address auxiliary memory; the signal CCX acts in the same manner, but the signal BACFP also causes a reduction. The address counter AC, the row counter RC, the buffer memory BS and so on are not influenced by the movement direction.

Figure 10:
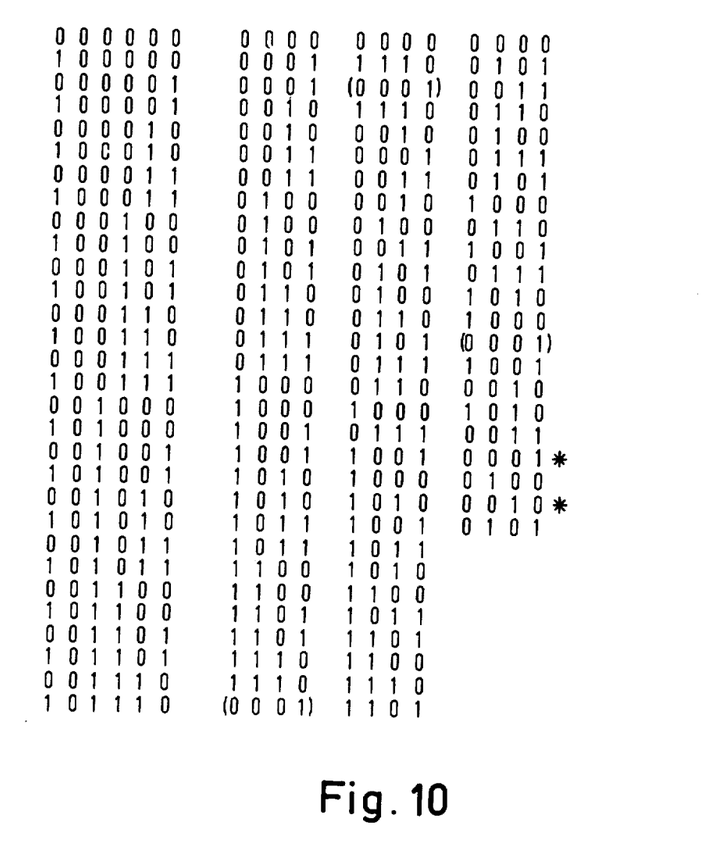
FIG. 10 shows data stored in the chaining unit.

FIG. 10 shows a part of the contents of the read-only memory 203. The first column provides the addresses for the character set of FIG. 1; the address bits which specify the character shape (in this case two bits) have been omitted for the sake of simplicity. The first address bit is the signal SCA on the terminal 216 and thus has the value "1" only at the beginning of a series of 54 calculations; it otherwise has the value "0." The second bit in this address range always equals zero and specifies the movement direction. The remaining bits represent the contents of the data flipflops 204 in decreasing significance levels. The next column provides the output data of the read-only memory. If the signal SCA=0, the value of the output data corresponds to the four least-significant address bits. If SCA=1, the output data are always one unit higher than the four least-significant address bits. The value of the data stated between brackets also provides the signal BACFP in the read-only memory 202 in order to increase the character address in the initial address auxiliary memory by one unit. The signal CCX in this case always equals zero. The third column is applicable to the other movement direction of the movable member (in this case the second address bit would then have to have the value "1," but this is not indicated). If SCA=0, the data correspond to the four least-significant address bits. If SCA=1, however these data are each time one unit higher. The data placed between brackets are again coincident with the occurrence of the signal BACFP in the read-only memory 202 in order to decrease the character address in the initial address auxiliary memory by one unit. The fourth column provides corresponding data for the character set of FIG. 2, the movement direction of the movable member being to the right. The initial column address to be loaded (second line, on the basis of a stored address 0000) has the value 5 (0101) as already indicated. If SCA=0, each subsequent clock pulse produces a column address which is two units higher. An asterisk denotes that when these data are retrieved, a carry signal CCX=1 occurs; this is the case if the new address denoted by an asterisk, has the value 1 or 2. If SCA=1, the new initial column address is found as follows. The distance between the two extreme recording elements is 42×53=2226 columns. Therefore, if the last determined column address was equal to "7," the new initial column address is equal to two, and so on. If the new address is equal to "1" in this case, the signal BACFP occurs. For the character set of FIG. 3 and for the other movement directions, corresponding column addresses are found. The contents of the read-only memory 201 similarly contains the initial addresses and increments for each set of characters.

What is claimed is:

1. A control device for activating recording elements in a recording device for the recording of characters which are composed of dot-shaped or line-shaped elements which are arranged in rows and columns on a record carrier, said recording device including a member driven back and forth in front of the record carrier in a row direction, said member having a least one group of recording elements adapted to record a character element, each group comprising a number of recording elements which at least equals the maximum number of rows of character elements in a character, at least one recording element within a group being associated with each row such that a predetermined row advance is present between successive recording elements of a group and between groups of successive recording elements, the recording elements being staggered in the row direction such that between successive recording elements of a group and between groups of successive recording elements, a predetermined column advance is present, a plurality of groups succeeding each other in the row direction, said control unit comprising:

a buffer memory for receiving characters to be recorded together on a line;

a character generator having a first sub-address input which is connected to an output of said buffer memory for the general addressing of a character;

a dot memory having an input which is connected to an output of said character generator for storing character element data and having outputs to supply control signals for the recording elements, such that for each displacement of said movable member over one column distance, and for each recording element, a character element is supplied;

measuring means for supplying movement signals and position signals to said movable member to activate, for each column displacement thereof, said dot memory through a connection between an output of said measuring means and an input of said dot memory;

a further output of said measuring means being connected to an input of said buffer memory to form, at the start of a line to be recorded by way of a movement of said member in a first direction, a starting address for the buffer memory and a starting condition signal for said character generator;

a chaining unit, an input of which is connected to an output of said measuring means, outputs thereof being connected to an address input of said buffer memory and a second sub-address input of said character generator for supplying a row or column address for a character generally addressed by said first sub-address;

said chaining unit containing the data of said row advances and column advances and a return connection for serially forming for all successive recording elements before movement of said movable member to the next successive column position, on the basis of said starting condition signal and the relevant row advances and column advances an address which is composed of first and second sub-address signals, in said character generator, assisted by the first sub-address signal supplied by said buffer memory, and to regenerate said starting condition signal at the end of the series with an additional unit of column advance in said first direction;

a detection circuit to detect an end-condition signal when a line of characters has been printed;

said character generator comprising:

at least two sets of characters having mutually different dimensions of the character-including-spacing-on-the-line field;

said chaining unit having at least one digital code for each of said character sets;

said measuring means being connected to an input of a starting memory in order to activate per character set one of at least one starting condition signal stored therein per character set for said chaining unit, such that the number of characters recorded per unit of line length can be adjusted under the exclusive control of said digital codes.

2. A control device as claimed in claim 1, wherein for at least one of said sets of characters at least two digital codes are present in said chaining unit to adjust, for the same character shape but with a different spacing-on-the-line, the number of characters recorded per unit of line length.

3. A control device as claimed in claim 1, further including:
a driving device for the transport of said record carrier over one line height in the column direction between two successive movement strokes of said movable member; said driving device comprising:
a digital input which is to be activated by said digital code and which serves to adapt the line height to the character width.

4. A control device as claimed in claim 1, wherein said character generator includes:
the character images of a first set of characters with a character field which comprises a first number of rows;
the character images of a second set of characters, having a second, smaller number of rows;
one row serving as a recording line;
further rows being addressable by lower-case characters which project underneath said recording line.

* * * * *